(12) United States Patent
Kartalov et al.

(10) Patent No.: US 7,611,673 B2
(45) Date of Patent: Nov. 3, 2009

(54) PMDS MICROFLUIDIC COMPONENTS AND METHODS OF OPERATION OF THE SAME

(75) Inventors: Emil Kartalov, Pasadena, CA (US);
Axel Scherer, Laguna Beach, CA (US);
W. French Anderson, San Gabriel, CA (US)

(73) Assignee: California Institute of Technology, Pasadena, CA (US)

( * ) Notice: Subject to any disclaimer, the term of this patent is extended or adjusted under 35 U.S.C. 154(b) by 400 days.

(21) Appl. No.: 11/529,130

(22) Filed: Sep. 28, 2006

(65) Prior Publication Data
US 2009/0242059 A1 Oct. 1, 2009

Related U.S. Application Data

(60) Provisional application No. 60/721,364, filed on Sep. 28, 2005, provisional application No. 60/729,674, filed on Oct. 24, 2005, provisional application No. 60/756,703, filed on Jan. 6, 2006.

(51) Int. Cl.
*B01L 11/00* (2006.01)
*G01L 7/00* (2006.01)
*G01L 27/00* (2006.01)
*G01M 3/02* (2006.01)

(52) U.S. Cl. .................. 422/103; 73/700; 73/1.57; 73/37

(58) Field of Classification Search ................. 422/103; 73/700, 1.57, 37
See application file for complete search history.

(56) References Cited

U.S. PATENT DOCUMENTS

| | | | |
|---|---|---|---|
| 5,593,130 A * | 1/1997 | Hansson et al. ............ 251/61.1 |
| 6,575,026 B1 * | 6/2003 | DeBar et al. .................. 73/202 |
| 2002/0011276 A1 * | 1/2002 | Sander ........................ 141/59 |
| 2005/0053952 A1 * | 3/2005 | Hong et al. .................... 435/6 |
| 2005/0164376 A1 * | 7/2005 | Balagadde et al. ........ 435/289.1 |
| 2005/0217743 A1 * | 10/2005 | Bohm ......................... 137/828 |
| 2005/0226742 A1 * | 10/2005 | Unger et al. ................. 417/412 |

* cited by examiner

*Primary Examiner*—Jill Warden
*Assistant Examiner*—Timothy G Kingan
(74) *Attorney, Agent, or Firm*—Daniel L. Dawes; Marcus C. Dawes (57) ABSTRACT

Component microfluidic devices which are integrated with polydimethylsiloxane (PDMS) microfluidic chips, include designs for an electrical and optical pressure gauge, valve, electrostatic and magnetic pumps, alternating or mixing pumps, a solenoid, a magnetometer, a magnetically actuated reversible filter and valve, and a hydrolysis valve. These devices enhance and miniaturize microfluidic control, thereby expanding the available capabilities and allowing complete system miniaturization for handheld diagnostic apparatuses.

5 Claims, 7 Drawing Sheets

PMDS MICROFLUIDIC COMPONENTS AND METHODS OF OPERATION OF THE SAME

RELATED APPLICATIONS

The present application is related to U.S. Provisional Patent Application Ser. No. 60/721,364, filed on Sep. 28, 2005, U.S. Provisional Patent Application Ser. No. 60/729,674, filed on Oct. 24, 2005 and U.S. Provisional Patent Application Ser. No. 60/756,703, filed on Jan. 6, 2006, all three of which are incorporated herein by reference and to which priority is claimed pursuant to 35 USC 119.

GOVERNMENT SUPPORT

The invention was developed in part using funds provided by the U.S. Government under an NIH contract no. 1RO1 HG002644-01A1. The U.S. Government has certain rights.

BACKGROUND OF THE INVENTION

1. Field of the Invention

The invention relates to the field of microfluidic devices and in particular to microfluidic pumps, pressure gauges and other components and to their method of operation.

2. Description of the Prior Art

Microfluidics is an exciting new technology that is establishing itself as an innovative practical tool in biological and biomedical research. Microfluidics offers the advantages of economy of reagents, small sample handling, portability, and speed. PDMS (polydimethylsiloxane) microfluidics in particular offers industrial scalability, parallel fabrication, and a unique capability for complex fluid handling schemes through fluidic networks containing integrated valves and pumps. However, microvalve actuation is still based on pneumatic control by macrovalves external to the devices themselves, while signal detection is generally done by optical microscopy, or some other macro means. By comparison to microfluidic technology itself, integration of electrical and optical devices into PDMS microfluidic chips is only at the dawn of its development. Herein lies an opportunity to produce a series of important devices for fluidic manipulation and signal detection.

The past ten years have witnessed the rapid development of PDMS (polydimethylsiloxane) microfluidic technology from the simplest of channels to an extended family of devices integrated by the thousands within the same chip. Such chips have emerged as the micro-scale hydraulic elastomeric embodiment of Richard Feynman's dreams of infinitesimal machines. PDMS microfluidics has been driven by applications from the beginning, with every advance being rapidly employed in devising solutions to specific problems. Thus it is no surprise that many exciting specialized chips have emerged to offer new capabilities, e.g. in protein crystallization, DNA sequencing, nanoliter PCR, cell sorting and cytometry, nucleic acids extraction and purification, immunoassays, and cell studies. After the development of pure microfluidic technology and the subsequent vigorous pursuit of its biological applications, it is becoming clear that the next generation of microfluidic devices would combine the fundamental technology with integrated electrical and/or optical systems for control and measurement. Such integration offers new analytical and functional capabilities, as well as true overall device miniaturization. A few steps in this new direction have already been taken, producing a capacitance cytometer, thermal cycler, and a spectrophotometer. Moreover, such devices can be arranged as independent but interconnected modules functioning within the boundaries of a single chip. Such chips with specific emphasis on devices for medical applications are called nanomedicine chips. They are anticipated to have the plumbing, electronics, temperature control, and functional capabilities to allow significant miniaturization of many of the current clinical laboratory machines.

BRIEF SUMMARY OF THE INVENTION

What is disclosed are designs for electromagnetic microdevices which are integrated with polydimethylsiloxane (PDMS) microfluidic chips, including valves, pumps, a magnetometer, and a filter. These devices enhance and miniaturize microfluidic control, thereby expanding the available capabilities and allowing complete system miniaturization for handheld diagnostic apparatuses.

The invention in one embodiment is thus a microfluidic apparatus for measuring pressure comprising a plurality of fluidic microvalves, a control channel for admitting a pressure to be measured communicated to the plurality of fluidic microvalves, and a plurality of flow channels corresponding to the plurality of fluidic microvalves. Each of the plurality of fluidic microvalves is characterized by a different closing/opening pressure. It must be understood that the fluidic microvalves can be of any design now known or later devised, including push-down or pull-up membrane valves, and it may be either normally open or normally closed. A plurality of transducers is provided corresponding to the plurality of flow channels to measure a parameter of the corresponding flow channel indicative of valve closure status from which the pressure can be determined within a magnitude interval.

The plurality of transducers comprises an electrical transducer for measuring an electrical parameter of each corresponding flow channel or an optical transducer for measuring an optical parameter of each corresponding flow channel. Electrical and optical transducers do not exhaust the possibilities and any transducer type which can be employed in a fluidic circuit can be equivalently substituted.

The electrical transducer comprises a pair of electrodes communicated with the corresponding flow channel to measure electrical resistance or conductance in the flow channel through the corresponding microvalve. An electronic circuit is coupled to the electrodes to provide the necessary electrical measurement of resistance or conductance or such other electrical parameter which may be equivalently chosen.

In one embodiment each of the plurality of fluidic microvalves has a membrane as the active element in the valve, and the membrane and valve is characterized by a different closing/opening pressure by means of different values for a membrane parameter. The membrane parameter includes, but is not limited to, the area of the membrane, a thickness of the membrane, or Young's modulus of the membrane. Again these choices with respect to membrane parameters do not exhaust the possibilities of equivalents and any design feature of the membrane of its affixation in the valve which affects the opening and/or closing threshold pressures is deemed to be equivalent.

The invention is also characterized as a microfluidic apparatus for alternating pumping comprising a plurality of fluidic microvalves, a control channel for admitting a pressure to be measured communicated to the plurality of fluidic microvalves, and a flow channel communicated to the plurality of fluidic microvalves. Each of the plurality of fluidic microvalves is characterized by a different closing/opening pressure and is arranged in sequential communication with the flow channel in a monotonic order of closing/opening pressures, so that a changing pressure applied to the control channel causes sequential closing/opening of the plurality of valves to pump fluid within the flow channel back and forth, in alternating motion or mixing.

The invention is still further defined as a microfluidic apparatus for pumping comprising a plurality of electrode pairs, and a flow channel into which the plurality of electrode pairs are electrically communicated. The plurality of electrode pairs are arranged along a length of the flow channel in a sequential order to apply a selected sequence of electrostatic fields to fluid within the flow channel to move the fluid in a predetermined direction in the flow channel. Each of the plurality of electrode pairs define a space between the electrodes within the flow channel. The electrode pairs are interleaved so that the corresponding space between one electrode pair partially overlaps the corresponding space between an adjacent electrode pair. The apparatus further comprises a circuit for applying a selective voltage sequence to selected ones of the plurality of electrode pairs.

The invention contemplates a microfluidic apparatus for providing a solenoidal magnetic field comprising a substrate, a current-carrying microchannel defined in the substrate, and a flow microchannel defined in the substrate. The current-carrying and flow microchannel are intertwined with each other. A conductive material is disposed in the current-carrying microchannel so that when current is applied thereto, the solenoidal magnetic field is created in which the flow microchannel is disposed. In the illustrated embodiment the conductive material is disposed in the current-carrying microchannel comprises electroplated metal filling the current-carrying microchannel.

Again in the illustrated embodiment the flow microchannel is substantially straight and the current-carrying microchannel is fabricated so that the current-carrying microchannel is coiled around the flow microchannel. In such a configuration or one equivalent to it, the apparatus is called a solenoidal microfluidic valve.

The invention is further characterized as a microfluidic apparatus for pumping comprising a plurality of microfluidic solenoids, and a flow channel disposed through the plurality of solenoids. The plurality of solenoids are arranged along a length of the flow channel in a sequential order and spaced apart to apply a selected sequence of magnetic field packets to a magnetically entrained fluid within the flow channel to move the fluid in a predetermined direction in the flow channel. The magnetically entrained fluid is comprises of a fluid with magnetic particles or nanobeads entrained therein.

The apparatus further comprises a circuit for selectively applying current to the plurality of microfluidic solenoids in a sequential order to move the fluid in the predetermined direction in the flow channel.

The invention is also rendered as a reversible microfluidic apparatus for filtration or valving comprising a microfluidic solenoid, and a flow channel disposed through the solenoid, and a plurality of magnetic particles entrained in a fluid within the flow channel, so that energization of the solenoid temporarily compacts the magnetic particles within a predetermined location in the flow channel within the solenoid to substantially reduce or stop flow of fluid through the flow channel or to filter flow of fluid through the flow channel.

The apparatus further comprises an ammeter coupled to the conductive material disposed in the current-carrying channel to measure the current resulting from EMF induced by the change of magnetic field as magnetic material approaches and passes through the flow channel.

The invention is yet further defined as a microfluidic apparatus for valving comprising a control channel, a flow channel corresponding to the control channel, a fluidic microvalve communicated to the control channel and pneumatically controlled therethrough to selectively open or close the flow channel, and an hydrolysis chamber wherein a liquid is selectively hydrolyzed to a gaseous state to activate the microvalve, the hydrolysis chamber being communicated to the control channel. In this embodiment the resulting apparatus is called a microfluidic hydrolysis microvalve.

The invention can also be characterized as a microfluidic apparatus for pumping comprising a plurality of microfluidic hydrolysis microvalves, a control channel communicated to the plurality of microfluidic hydrolysis microvalves, and a flow channel, where the plurality of microfluidic hydrolysis microvalves are sequentially communicated along the flow channel, so that when the plurality of microfluidic hydrolysis microvalves are selectively operated in sequence fluid is moved along the flow channel in a predetermined direction.

In general the invention includes a microfluidic apparatus for pumping comprising a flow channel, a plurality of microfluidic means for affecting flow in the flow channel, and a control channel communicated to the plurality of microfluidic means. Each of the plurality of microfluidic means is sequentially communicated along the flow channel, so that when the plurality of microfluidic means is operated in a selected sequence, fluid is moved along the flow channel in a predetermined direction.

In the illustrated embodiments the plurality of microfluidic means comprises a selectively operated electrostatic valve, a selectively operated microfluidic solenoid, one of a sequence of selectively operated microfluidic valves with an unique opening/closing pressure chosen from a monotonic sequence of magnitudes, or combinations of the same.

Still further the invention includes methods of operation for each of the foregoing described microfluidic apparatus.

While the apparatus and method has or will be described for the sake of grammatical fluidity with functional explanations, it is to be expressly understood that the claims, unless expressly formulated under 35 USC 140, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 140 are to be accorded full statutory equivalents under 35 USC 140. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Electrical-Microfluidic Pressure Sensor Alternating Pump

The disclosed pressure gauge is one of a set of components that will become increasingly important as microfluidics was developed further into hybrid integrated architectures wherein microfluidic and electrical components were combined to form advanced novel devices. In particular, this sensor can be used to monitor pressure and electrically report the result to the logic circuitry that controls the overall PDMS MEMS device. The first electrical-microfluidic pressure sensor is thus disclosed here. Applied pressure determines the status of an array of PDMS microfluidic valves 36 of varying closing pressures. The electrical resistance of each valved channel 40 was high if and only if the respective valve 36 was closed. Thus valve array status and, therefore, an interval estimate of the pressure, were reported electrically. The overall microdevice functions as a pressure gauge with electrical readout. Its compatibility with both electrical circuitry and the basic PDMS microfluidic technology make it a suitable subsystem for the next generation of hybrid PDMS MEMS.

Figures 5A, 5B:
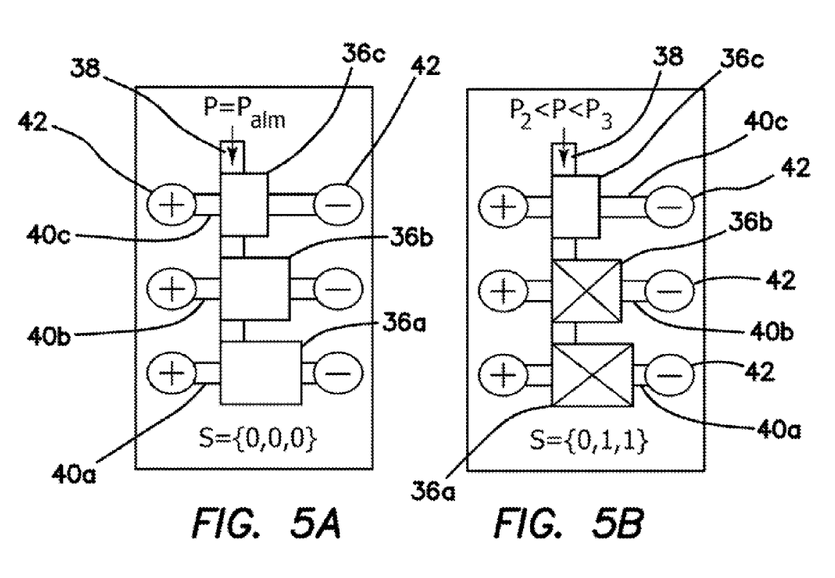
FIGS. 5a and 5b are schematic diagrams illustrating the structure and operation of a plurality of valves operating as a pressure gauge with electrical readout according to the invention.
Figure 6A:
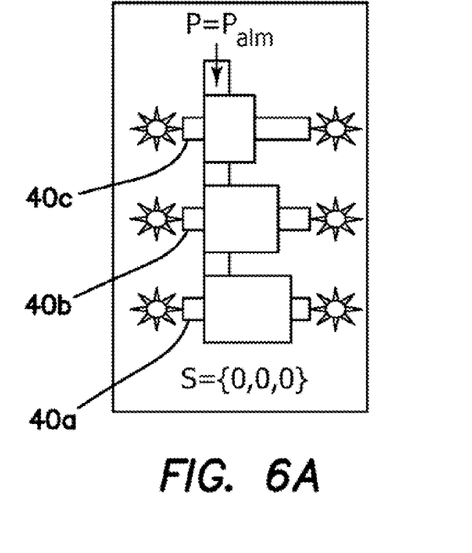
FIGS. 6a and 6b are schematic diagrams illustrating the structure and operation of a plurality of valves operating as a pressure gauge with optical readout according to the invention.
Figure 6B:
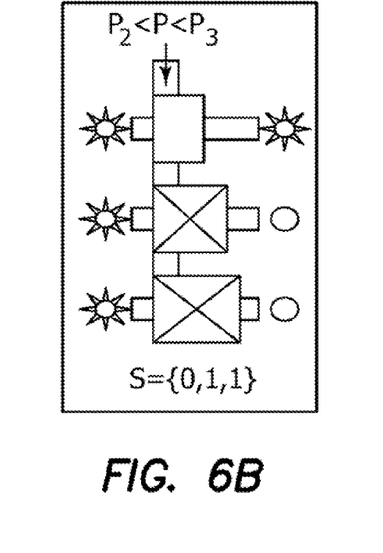
Figure 7A:
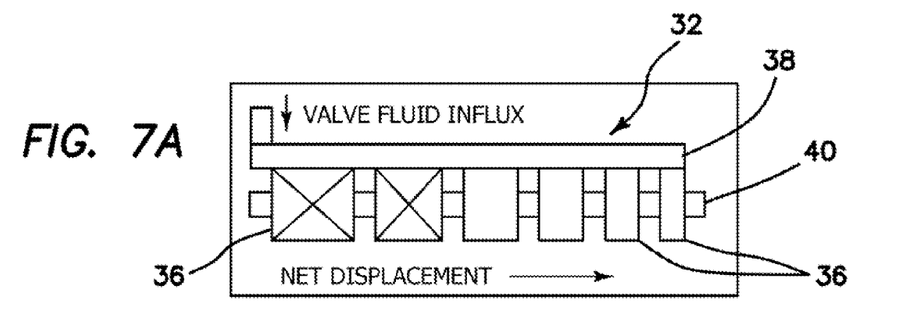
FIGS. 7a and 7b are schematic diagrams illustrating the structure and operation of a plurality of valves operating as an alternating pump according to the invention.
Figure 7B:
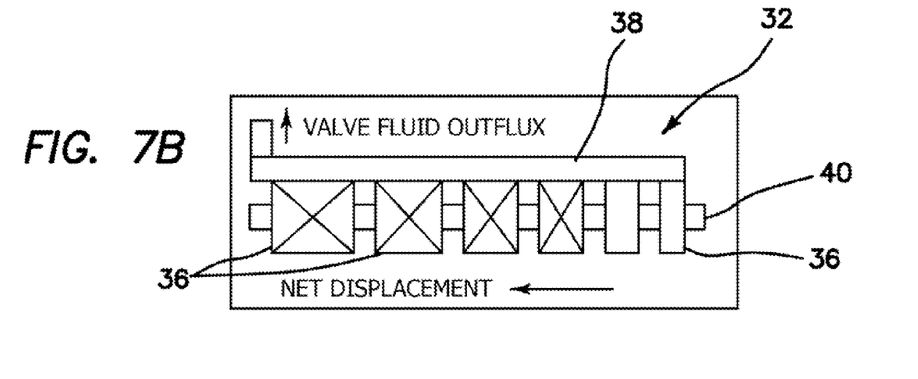

A pressure gauge 30 for soft-lithography PDMS microfluidics is disclosed as illustrated in FIGS. 4a-4b, 5a, 5b, 6a and 6b and an alternating pump 32 as illustrated in FIGS. 7a and 7b. The pressure gauge 30 reads the value of the applied pressure using the property that different valve dimensions result in different closing pressures in a heterogeneous valve array. In addition, this readout is convertible to an electrical or optical signal, e.g. by conductance/capacitance or waveguide light intensity measurements respectively. An alternating pump 32 moves flow channel 40 fluid back and forth with zero net displacement over one cycle, thereby enabling mixing in a straight channel 40 and facilitating reactions between the liquid phase and the microchannel surface 34. Both devices 30 and 32 are built using already available soft-lithography fabrication techniques and are fully compatible with already known device components.

An electrolyte-filled valved microchannel 40 in a PDMS chip experiences a drastic increase in electrical resistance when and only when it is completely pinched off by the microvalve 36. This effect establishes a 1-1 correspondence between electrical resistance (low or high) and valve status (open or closed), thereby providing an electrical means of reporting valve status. Valve status (open or closed) is determined by applied pressure being below or above the characteristic closing pressure of the valve 36; therefore, the valve 36 reports an upper or lower bound for the applied pressure, respectively. An array of such valves 36 of varying closing pressures reports a set of inequalities that produce an interval estimate for the pressure. That estimate is reported as a set of resistance values of the respective microchannels, due to the 1-1 correspondence above. Hence, the overall system acts as an electrical microfluidic pressure gauge. This sensor forms a useful subunit within PDMS MEMS (micro-electro-mechanical systems), e.g. by reporting pressure values to electrical feedback control loops.

What is disclosed is the first known electrical microfluidic pressure gauge 30. Each valve 36 remains open up to some characteristic pressure determined by its dimensions. Therefore, there is another 1-1 correspondence, this time between valve status (open/closed) and applied pressure (below/above the valve's characteristic pressure). In essence, valve status is equivalent to an upper or lower bound on the applied pressure. Then, an array of valves 36 closing at different characteristic pressures would offer a set of inequalities that combine to produce an interval estimate of the applied pressure. The 1-1 correspondence between valve status and electrical resistance allows reporting this estimate electrically as a set of resistance states of the respective microchannels 40. The resulting system acts as a microfluidic pressure gauge with electrical readout. The device compatibility with standard PDMS microfluidic technology and electrical control make it ideally suitable for integration in the future PDMS MEMS.

Figure 4A:
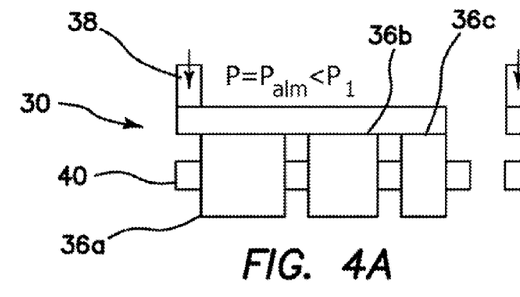
FIGS. 4a-4d are schematic diagrams illustrating the structure and operation of a plurality of valves operating as a pressure gauge according to the invention.
Figure 4B:
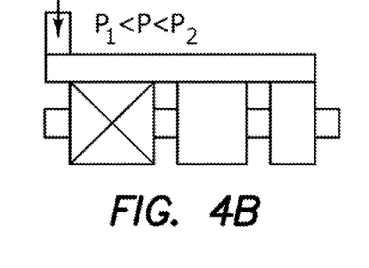
Figure 4C:
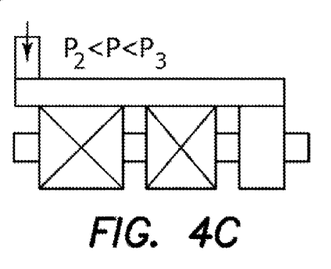
Figure 4D:
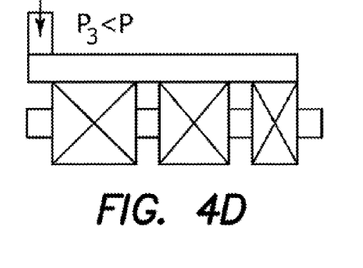

Morphologically, a pressure gauge 30 is a heterogeneous array of interconnected valves 36 that control one or more flow channels 40 as described in FIGS. 4a-4d. As is conventionally known different physical dimensions of the microfluidic valve membranes result in different closing pressures whether they be push-up or pull-down valves 36. An array of microfluidic valves 36a-36c of varying membrane dimensions indicate the applied pressure by the open/shut state of the valves 36a-36c as depicted diagrammatically in the example of FIGS. 4a-4d. A control channel 38 is communicated to each valve 36a-36c and each valve 36a-36c controls flow channel 40 or a separate corresponding flow channel 40. For example, valve 36a closes only at a predetermined minimum pressure $P1 > P_{atm}$ as determined by its membrane size as indicated in FIG. 4b. Valve 36b closes only at a predetermined higher minimum pressure $P2 > P1$ as determined by its membrane size as indicated in FIG. 4c. Valve 36c in turn closes only at a predetermined higher minimum pressure $P3 > P2$ as determined by its membrane size as indicated in FIG. 4d. The sensed pressure is thus measured or binned according to these predetermined pressures P1-P3. If the measure pressured $P < P1$, then all valves 36a-36c are open. If the measured pressure $P1 < P < P2$, then valve 36a is closed and valves 36b and 36c are open. If the measure pressure $P2 < P < P3$, then valves 36a and 36b are closed and valve 36c is open. If $P > P3$ then all valves 36a-36c are closed. The precision of pressure measurement is increased by increasing the number of valves 36 and their closeness of their membrane areas.

If the dimensions are properly chosen, the result can be a calibrated pressure scale, which may be arranged to be linear. The readout is then converted into an electrical, optical signal or other signal for transmission and processing. For example, if electrical contacts 42 are fabricated in the microfluidic substrate of the corresponding flow channels 40a-40c, both the measured capacitance and conductivity changes in channels 40a-40c change when the respective valve 36a-36c switches state as shown in FIGS. 5a and 5b.

Alternatively, if the flow channels 40 are filled with a high refractive index substance, e.g. photoresist, and the channels 40a-40c are used as light waveguides, then a valve switching state changes the intensity of transmitted light as depicted in FIGS. 6a and 6b. The measured changes in both cases produce an upper and lower bound for the applied pressure.

It should be noted that a heterogeneity of closing pressures can be produced not only by varying the lateral dimensions of the valve 36 as shown in FIGS. 4a-4d, but also by varying other valve or membrane parameters, e.g. thickness of the membrane and Young's modulus of the polymer. No PDMS pressure-sensing device has previously been reported, which makes the described pressure gauge the first of its type.

Morphologically, an alternating pump 32 is a heterogeneous array of interconnected valves 36 arranged in either ascending or descending order of closing pressure from the pressure source along the flow channel 40 as diagrammatically depicted in FIGS. 7a and 7b. When pressure is applied, leakage into the valve pockets does not allow the static pressure to reach its maximal applied value immediately. As a result, the valve 36 of lowest closing pressure closes first, followed by the next valve 36 in ascending order of closing pressure, thereby producing a net displacement along the same direction as indicated in FIG. 7a. When pressure is released, static pressure drops and the valve 36 with the highest dosing pressure will snap open first, followed by the next highest. Hence, valves 36 open in opposite order, producing an equal net displacement in the opposite direction as indicated in FIG. 7b. Thus a complete pump cycle produces overall zero net displacement but the contents of the flow channel 40 has moved back and forth, ergo the device is called an alternating pump. Such an alternating capability allows mixing in straight channels 40 and facilitates reactions between molecular species in the liquid phase and on the microchannel surface. As mentioned above, the heterogeneity of closing pressures can be accomplished by multiple means, but the functionality will be the same.

The operation of the alternating pump 32 can be duplicated by two serpentine pumps. With opposite chirality, one serpentine over a circular channel, one triplet pump with an alternating sequence, or one triplet pump aver a circular channel. All these alternatives, however, require more real estate on the chip and more control channels 38 (at least two or three, instead of one). Thus the alternating pump 32 has its niche of efficient application.

The fabrication of an array of 30 pairs of electrodes for the pressure gauge device 30 will now be described. DWL66 direct mask writer (Heidelberg Instruments GmbH, 69406 Heidelberg, Germany) with a 20 mm head was used to write the respective pattern on a glass slide coated with 90 nm non-oxidized chrome and 530 nm Az1500 photoresist (Telic Co., Valencia, Calif. 91 355). The photoresist was developed for 20 sec in Microposit MF-322 (Rohm and Haas Electronic Materials) and the glass slide was washed with deionized water. The now-exposed areas of chrome were etched away for 3 min in CR-7 "chromium photomask etchant, surfactant added" (Cyantek Corp.). The sample was washed with deionized water, blown dry, and stored as is. Immediately before assembly to the PDMS slabs, the substrate was washed with acetone to remove the remaining protective photoresist, washed with ethanol, and blown dry.

Conventional fabrication and mold techniques was employed to produce the molds and PDMS devices. The latter were washed in ethanol and blown dry before being bound to the ready metallized glass substrate. The now assembled chips underwent a final bake in an 80° C. oven overnight.

Figure 8:
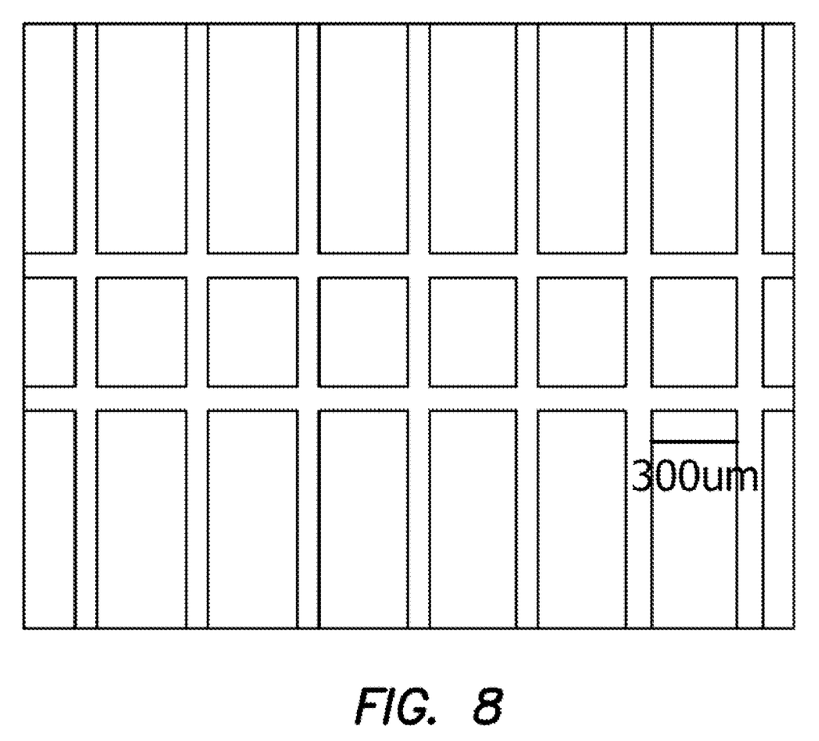
FIG. 8 is a photograph of a microfluidic array used to test the operability of the invention as a pressure gauge.

The macrofluidic setup for verification of operability included an inverted 1×50 Olympus microscope, pressure regulators from AirTrol Components Inc (New Berlin, Wis. 53146)) and a digital pressure gauge from TIF instruments Inc (Miami, Fla. 331 50). 23-gauge steel tubes from New England Small Tube Corp. (Litchfield, N.H. 03052) were plugged into the chip's control channel ports. Their other ends were connected through TygonB tubing (Cole-Parmer, Vernon Hills, Ill. 60061) to Lee-valve arrays (Fluidigm Corp. South San Francisco, Calif. 94080) operated by LabView software on a PC computer. A Nikon stereoscope SMZ-2T was equipped with a Nikon CoolPix990 color camera. Resistance measurements were conducted with a multimeter MiniRangernaster from Extech Instruments. Basic scheme conventional multilayer soft lithography was used to fabricate PDMS microfluidic chips. A comb-like array of 100 μm-wide flow channels 40a-40e . . . in the lower layer was crossed with a single control channel 38 in the upper layer to produce an array of pushdown microfluidic valves 36 of varying length (55 to 200 pm). This PDMS two-layer device was then bound to a metallized glass substrate in such a way that each prong of the comb was aligned with its own pair of electrical contacts, thereby completing the chip fabrication as depicted in the photograph of FIG. 8.

A salty buffer (Tris 10 mM, NaCl 10 mM, $MgCl_2$ 0.1 M, pH 8) was introduced in the lower (flow) channel 40 communicated with flow channels 40a-40e . . . by applying pressure and letting the preceding air escape through the polymer matrix. Filtered distilled water was similarly introduced in the upper (control) channel 38. The flow channel 40 was then left at atmospheric pressure, while pressure was applied to the control channel 38. For each value of the applied pressure, resistance was measured between the contacts 42 of each prong. The status of the respective valve 36 was also checked visually. Ionic redistribution in response to the applied DC field tends to increase the resistance of the channel 40 over time. While rapid measurements make this a small effect in the presented system, the polarity of applied voltage was reversed at every pressure setting to decrease the effect further.

As PDMS and glass were electrical insulators, it was a reasonable expectation that an uninterrupted channel 40 filled with a salty solution would drastically increase its electrical resistance if and only if it was pinched off by a closed valve 36. Simple preliminary experiments confirmed that expectation. The observed effect establishes a 1-1 correspondence between channel resistance (low/high) and valve status (open/closed). The mechanical properties of the valve 36 establish another 1-1 correspondence, this time between the valve status (open/closed) and the applied pressure (insufficient/sufficient). Note that a single valve 36 does not directly report the value of the pressure, but reports if the applied pressure was below or above the valve's closing pressure. In essence, a single valve status produces a single inequality. Several such inequalities would narrow down the estimated pressure value better, especially if the respective bounds were judiciously selected. These bounds were the valves' closing pressures. Closing pressure was tuned by varying the valve's dimensions. Then an array of valves 36 of different dimensions would provide the sought set of pressure inequalities. Larger valves 36 generally close at lower pressures. Hence, in principle, the applied pressure would be bound by the characteristic closing pressures of the largest open and the smallest closed valve 36. The resulting interval estimate for the applied pressure would be as narrow as the interval between the bounds. This analysis suggested the basic scheme described above.

The scheme was implemented for applied pressures of 0.5 to 19 psi, in steps of 0.5 psi. The maximal value was set by the pressure at which all valves 36 were closed. Further increase in the pressure would not change the result, while pressures in excess of 20 psi significantly increase the risk of layer delamination. All flow-channel prongs had resistances between 26 and 64 MΩ when the valves 36 were open, while the resistance increased beyond the dynamic range of the multimeter (2 GΩ)) when and only when the respective valve 36 closed completely.

Figure 9A:
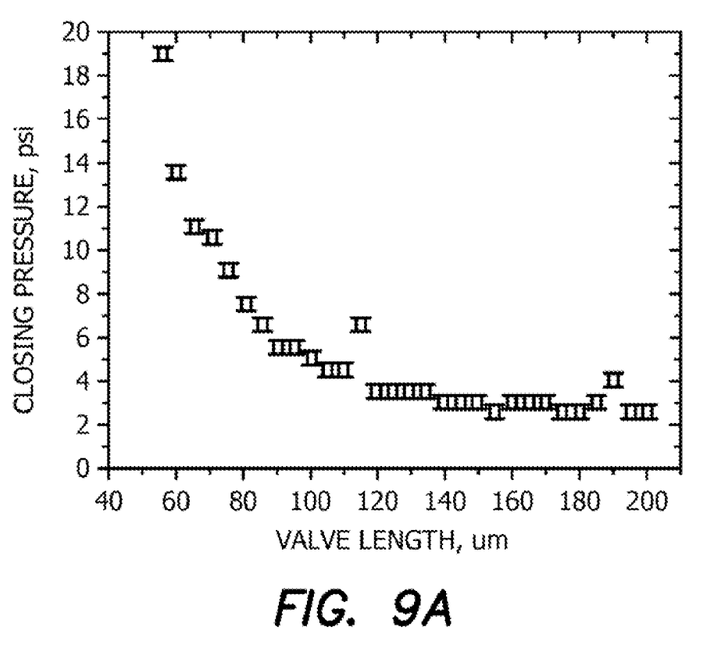
FIG. 9a is a graph of the closing pressures of the valves of FIG. 8 as a function of valve length.
Figure 9B:
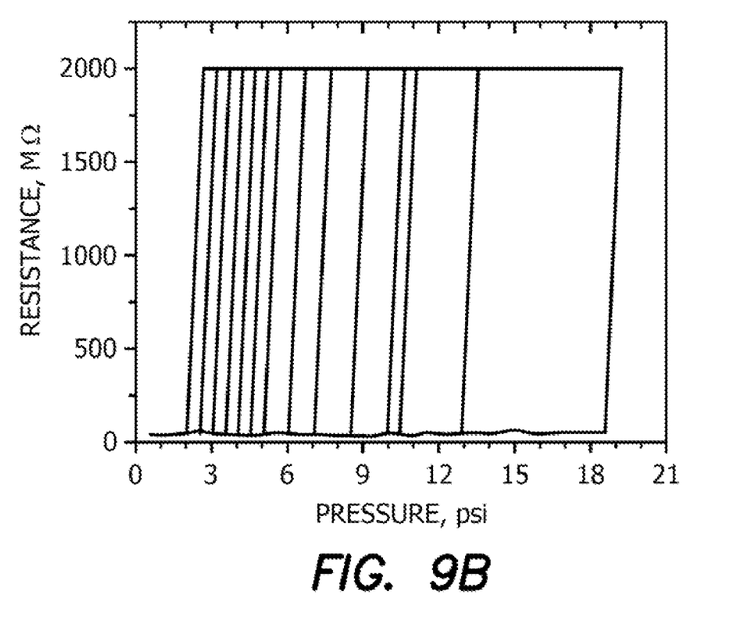
FIG. 9b is a graph of the electrical resistance of the flow channel through the valves of FIG. 8 as a function of pressure.

The graph of FIG. 9a shows the characteristic closing pressure versus valve length, for each valve 36. FIG. 9b is a graph which shows the resistance pattern versus applied pressure. Since in certain cases multiple valves 36 closed at the same pressure, their resistance patterns practically overlapped. Consequently, multiple valves 36 in FIG. 9a share one curve in FIG. 9b. The system can be used as a pressure gauge, wherein the measured resistance of each channel indicates the status of the corresponding valve 36 while the calibration ties that status to the applied pressure. For example, if all valves 36 up to and including the 65 μm valve 36 were in "high resistance" state, while all valves 36 above it were in "low resistance state", then according to FIG. 9a, the applied pressure was between 10.5 and 11 psi. Alternatively, FIG. 9b can be similarly used to arrive at the same conclusion.

It is clear that the accuracy of pressure measurement was dependent on the pressure spacing of data points in FIG. 9a, or of curves in FIG. 9b. The desired accuracy in each particular application would require different closing pressures and thus different dimensions. FIGS. 7a and 7b show that high accuracy at high pressures cannot be achieved by varying only the valve length. However, if that restriction was relaxed, more values for the closing pressures become available and the pressure spacing can be shrunk accordingly, thereby improving accuracy. FIG. 9a shows that valves 36 of lowest closing pressures generally break the rule that larger valves 36 close at lower pressures. Of course a simple initial calibration can allow the device to function correctly, but if a better programmability of properties was required, then fabrication parameters can be changed to shift the sensitive part of the FIG. 9a curve to lower pressures. For example, decreasing valve membrane thickness would decrease the closing pressure for the same lateral dimensions.

Finally, a random fabrication artifact is believed to be responsible for the significant deviation of the 115 μm valve 36 from the general dependence in FIG. 9a. An individual glitch like that can be factored out trivially, as the pressure estimate was based on the results of the entire array.

Electro-Osmotic Peristaltic Micropump

Figure 1A:
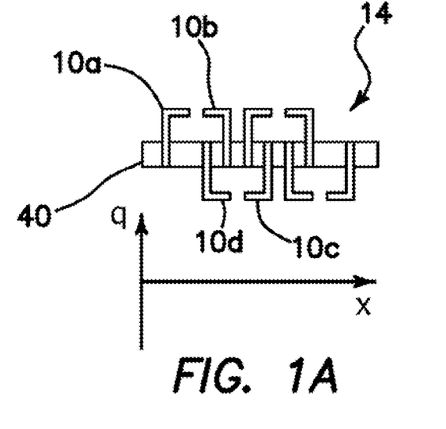
FIGS. 1a-1f are schematic diagrams illustrating the structure and operation of a peristaltic pump according to the invention.
Figure 1B:
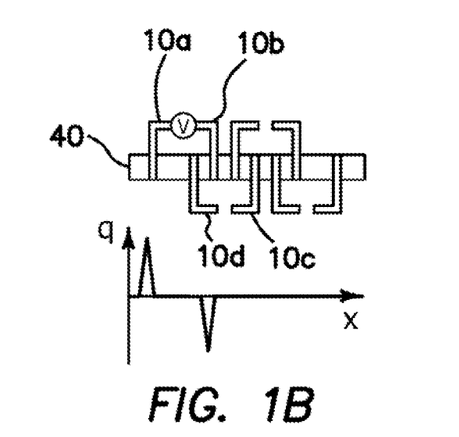
Figure 1C:
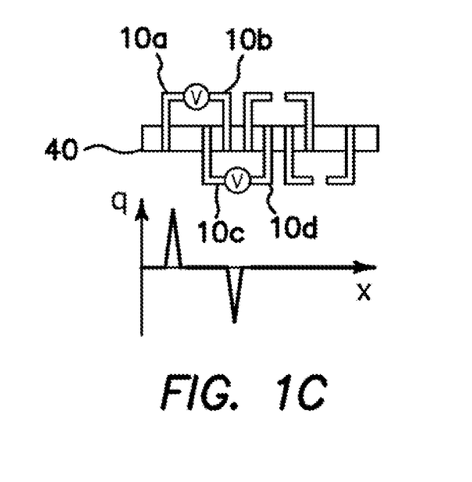
Figure 1D:
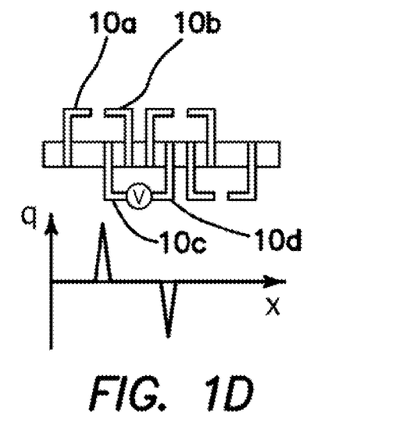

FIG. 1a is a diagram showing microelectrodes 10 fabricated under a microfluidic channel 40. If a DC voltage is applied to the first pair of electrodes 10a and 10b, the available ions inside the water in the channel 40 redistribute themselves to produce a net charge profile as shown in the graph of FIG. 1b which is simplistic linear approximation for ease of explanation. If the voltage is removed, the charges would redistribute themselves back to zero net charge everywhere. But, what if a DC voltage is applied to a second pair of electrodes 10d and 10c, while the first pair 10a and 10b is still energized as illustrated in FIG. 1c, then the net charge distribution moves in the direction of the next pair as diagrammatically depicted in FIG. 1d.

Since both the positive and the negative peaks move in the same direction when the ions drag water molecules, it must be that there is a positive net flux of water in the same direction. Iterating this actuation down the channel 40 resembles a peristaltic wave, whence the pump is called a electro-osmotic peristaltic micropump 14.

Clearly, there must be at least two pairs of electrodes 10 to break the symmetry and produce a preferred direction. In principle, a large number of stages allows multiple peristaltic waves to travel In the same direction simultaneously, thereby increasing the number of transported ions, and thus the amount of dragged water per unit time. However, a larger number of stages also means an overall bigger device, which could be disadvantageous, depending on the application. In general it is clear that the number of electrode pairs 10a and 10b and their spacing must be optimized for maximal throughput gained by minimal size of the device.

Figure 1E:
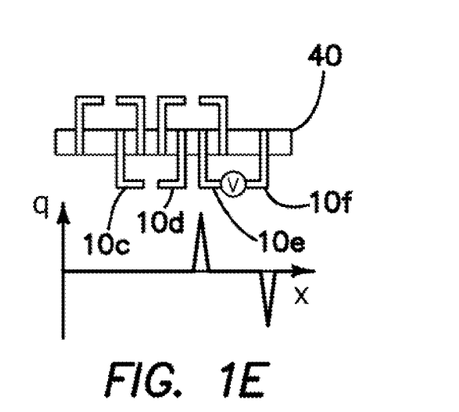

Once the ion packets reach the end of the device 14 as illustrated diagrammatically in FIG. 1e, the voltage is removed to restore the electrical configuration of device 14 to the initial stage shown in FIG. 1a. Then the driving sequence is reiterated. If each bit is given a value 1 for applied voltage and 0 for no applied voltage, then the described actuation sequence is {1000, 1100, 0100, 0110, 0010, 0011, 00001) for a four-stage pump 14.

Figure 1F:
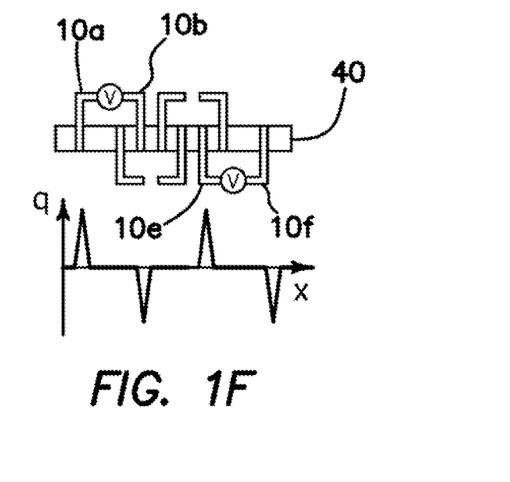

Other actuation sequences are also possible. For example, multiple peristaltic waves may be permissible, e.g, FIG. 1f. The peristaltic waves just have to be spaced enough to exclude mutual detrimental effects. For example, in FIG. 1f, the waves should not produce such problems. For example, the actuation loop for a six-stage device with a two-stage spacing between devices would be (100100, 110110, 010010, 011011, 001001, 001100).

Device 14 miniaturizes fluid propulsion and eliminates the need for outside pressure sources. Thus it would be an important step towards complete system miniaturization required, e.g. for handheld biomedical diagnostic devices.

Microsolenoids

The recent reduction to practice of microfluidic vias as disclosed by (PAU.59/CIT4467) U.S. patent application Ser. No. 11/502,135, filed on Aug. 19, 2006 entitled, "Integrated Microfluidic Vias, Overpasses, Underpasses, Septums, Microfuses, Nested Bioarrays And Methods For Fabricating The Same", and incorporated herein by reference, and the concomitant easy access to truly three-dimensional multi-layer soft-lithography PDMS microfluidic devices opens new possibilities for architecture for device 14.

Figure 2A:
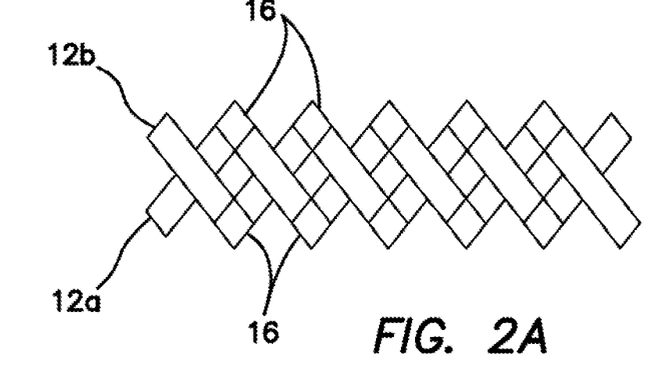
FIGS. 2a-2c are schematic diagrams illustrating the structure and operation of a microsolenoid according to the invention.

FIG. 2a is a top plan layout view which shows one such structure, which can be stylized a two-string braid of microfluidic channels 40a and 40b defined in two levels of a microfluidic substrate and entwining with each other. In the FIG. 1a the intertwining channels 40a and 40b are connected at their ends by a via 16, thereby intertwining or jumping between an upper and lower level in a substrate. Channel segment 40a is define in an upper layer and then jumps by a via 16 to a lower level and then back up again at the next via 16 in an alternating fashion. The same topological approach can be realized in three-layer substrates, where the central channel 40c is in a middle layer as diagrammed in FIGS. 2b and 2c. There may be advantages to the embodiment of FIGS. 2b and 2c, e.g. tighter turns for a solenoid, at the expense of an extra layer of fabrication.

If one of the channels has metal electroplated into it, then a wire twisting around a microfluidic channel results. Such electroplating could be done by immersing the PDMS device 14 into a bath of suitable electrolyte, plugging an electrode 10 into one of the ports of the channel, and then applying a voltage between the bath and the port electrode 10. The growth of electroplated material will follow the electric field lines and advance an edge from the starting electrode 10. Thus a metal coating is formed in the corresponding channel 40, thereby producing a self-assembled microwire. When current passes through such a wire, a magnetic field is established just like with a solenoid at the macroscale.

Electromagnetic Peristaltic Micropumps

Figure 2B:
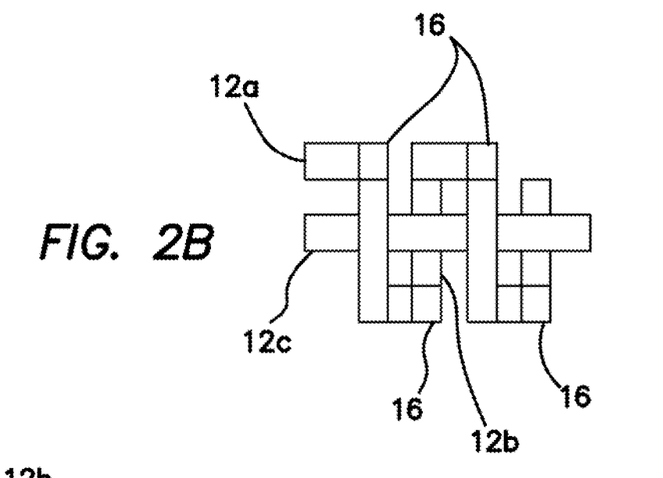
Figure 2C:
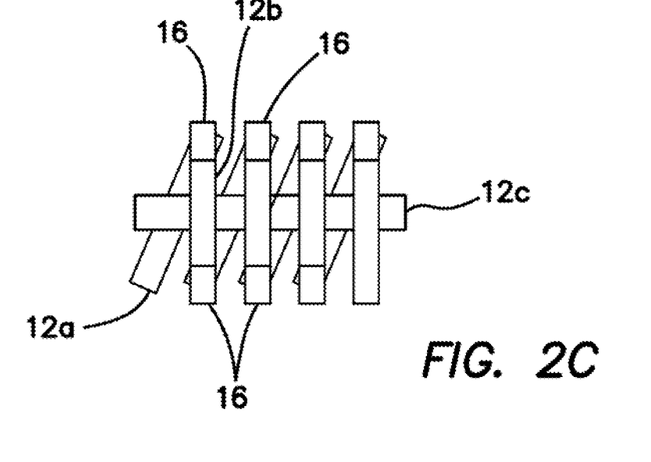
Figure 3A:
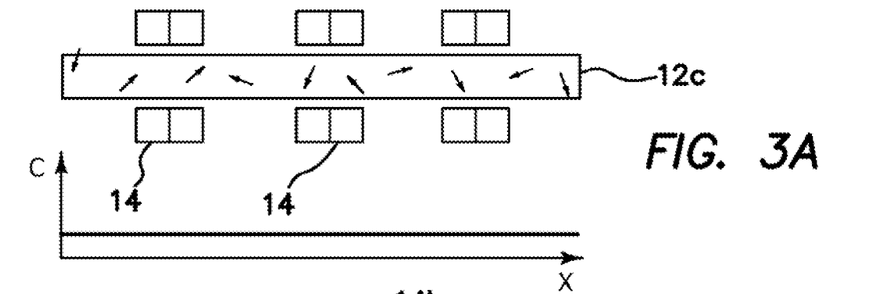
FIGS. 3a-3d are schematic diagrams illustrating the structure and operation of a plurality of microsolenoid stages acting as a pump according to the invention.
Figure 3B:
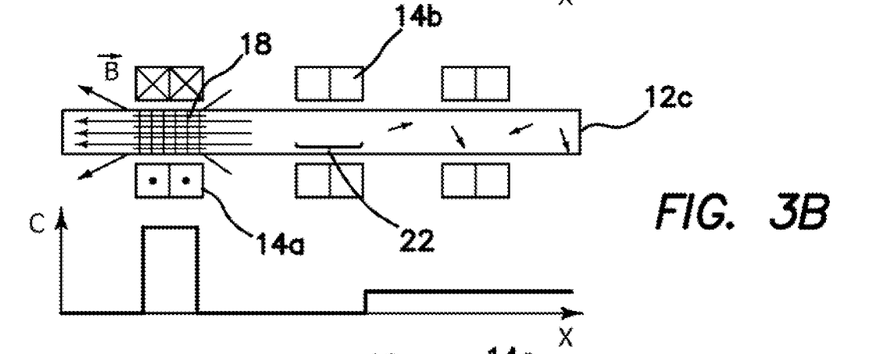
Figure 3C:
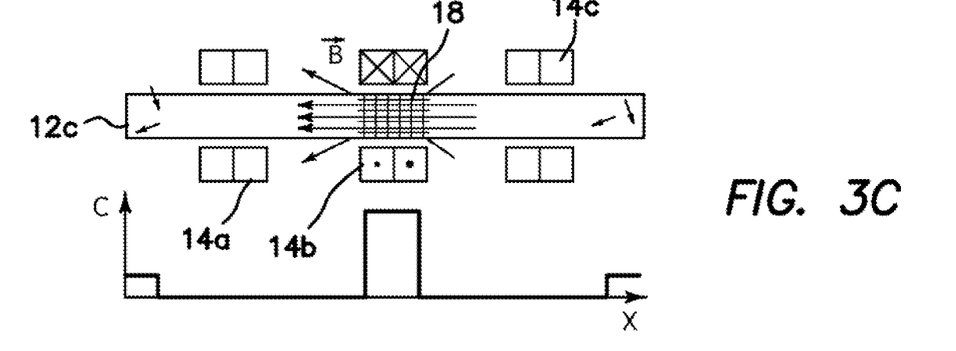

This analogy gives rise to the name for the solenoid 14 of the embodiments of FIGS. 2a-2c as a "microsolenoid". The current that runs through the microsolenoid produces a magnetic field that attracts magnetic microbeads or nanoparticles inside the liquid within the entwined channel 40c. The physics basis for this action is the magnetic force acting on a magnetic dipole in the presence of an outside magnetic field F=grad (m·B) where F is the force, m is the dipole moment, and B is the magnetic field (or flux density), Initially, no current is running through the solenoid 14, there is no solenoid magnetic field, and the nanoparticle concentration is uniform along the channel 40c as diagrammed in the depiction FIG. 3a. When voltage is applied, electrical current runs along the "wire" of solenoid 14 comprised of the metallization formed in channels 40a and 40b, and generates a magnetic field inside the solenoid cavity 22 in channel 40c in the proximity of a solenoid 14. The nanoparticle dipoles tend to align itself with the external field. Then the scalar field of the dot product increases fastest towards the solenoid 14, so the force is attractive. Once inside the solenoid cavity 22, the scalar field is close to constant, so its gradient is minimal and thus the force decreases in magnitude. Thus the microsolenoids 20 can be utilized for an initial pull in their direction, which produces a compaction peak in the nanoparticle concentration in channel 40c as shown in FIG. 3b. Then another solenoid 14b downstream is activated while the upstream solenoid 14a has its voltage disconnected. The drop in the current will generate an EMF (electromotive force) in the upstream solenoid 14a while the increase in current in the downstream solenoid 14b will induce an additional EMF in the upstream solenoid 14a, but none of these effects are important for nanoparticle behavior in channel 40c. The collection of nanoparticles or molecules, collectively defined as the nanoparticle packet 18, is now attracted to the downstream solenoid 14b and will stop moving only when it is inside the downstream solenoid 14b as shown in FIG. 3c. The propagation of this packet 18 will drag the liquid behind and thus produce pumping in the direction determined by the actuation sequence.

Figure 3D:
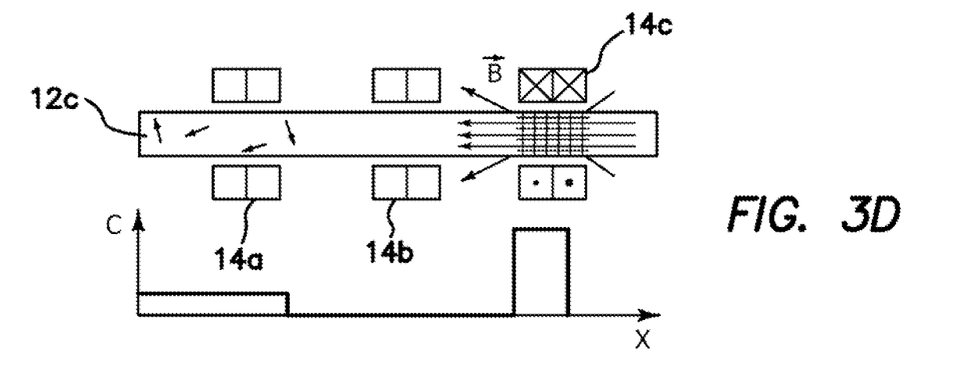

At least three solenoids 14a, 14b, 14c are necessary to produce a net flux in one direction, If only two are used, the packet 18 will oscillate between the two and thus produce an alternating pump, which would be useful for mixing or producing a nanopulsation, but not for overall net propulsion or movement of fluid in one direction. With three solenoid stages 14 however, the symmetry can be broken to allow net pumping in either direction, as determined by the actuation sequence depicted in FIG. 3d, much like peristalsis used by pneumatic pumping.

Distances must be optimized for best results. If the stages or solenoid turns 20 are too close to one another, the packet 18 propagates only a small distance with each solenoid 14 and thus the throughput per solenoid 14 could be low. In addition, solenoids 14 which are too close to each other require that fewer solenoids 14 to be energized at the same time to avoid backward forces on the downstream packets 18. If the solenoids 14 are too far apart from another, then the attractive force to the next solenoid 14 would be quite weak and thus produce low acceleration, increasing the time between activation of successive solenoids 14, thereby lowering the overall throughput.

Preliminary calculations show that a 150×100×10 μm packet 18 of 50% by volume of cobalt beads experience enough force from a single-turn 1 mA coil to generate effective static pressure of 0.5 psi and pressure differential of 2 Pa/μm. Also, since the magnetic force is maximal at distances equal to half the radius of the solenoid 14, having more than 10 turns at channel dimensions of approximately 60 μm does not produce further gains due to diminishing returns, Still, a 10-turn solenoid is relatively compact, namely about 1 mm and produces enough pressure for transport. It should be noted that 5 psi static pressure difference produces typical flow speeds of 500 μm/sec in 100×10 μm channels 40 of 10 mm length. Such speeds are generated by pressure gradients of 3.3 Pa/μm, which is close to the expected pressure gradient generated by a single-turn coil. This is calculated to work a 1 mA currents, which generate dissipation rates of 0.1 Kelvin/sec for a single loop heating a 300×100×100 μm chunk of PDMS. If heating becomes a problem, larger channels can be integrated and filled with water to cool down the device as necessary.

Reversible Electromagnetic Microfilter and Microvalve

If one single stage 14 of such a pump as shown in any one of FIGS. 3a-3d is utilized, it could serve as a reversible gate for the liquid in the channel 40. Normally, nanoparticles would not interfere with the flow, especially if they are made small enough and coated with plastics to make then neutral-buoyant in water or the fluid. However, if the solenoid 14 is activated, then the local concentration of particles would peak and thus temporally produce a sieve through which the water must pass. So long as the magnetic force on the nanoparticle is stronger than the drag force from the water or fluid, the "sieve" or "plug" would remain in place. The calculations above show that this is feasible. Thus, filtering would be produced for low nanoparticle concentrations, while a real valve 36, albeit possibly a leaky one, would be produced for high concentrations. Both devices would be reversible, since switching off the electrical current would let the "sieve" or "plug" dissipate and thus normal flow would proceed as before.

In this scenario, the liquid must be propelled by an agency external to these two devices. Such might be simple static pressure or perhaps an electromagnetic micropump upstream or downstream from the filter/valve device.

Micromagnetometer

Finally, microsolenoids 14 as shown in any one of FIGS. 3a-3d can be used as magnetometers. e.g. for single-cell MRI (magnetic resonance imaging), for sensing magnetotactic bacteria, and for cell-sorting based on magnetic nanoparticle tags. In these cases, the microsolenoid 14 is connected to a sensitive ammeter to measure the current resulting from EMF induced by the change of magnetic field as magnetic material approaches and passes through the solenoid 14.

Electrolysis Microvalves

Figure 10:
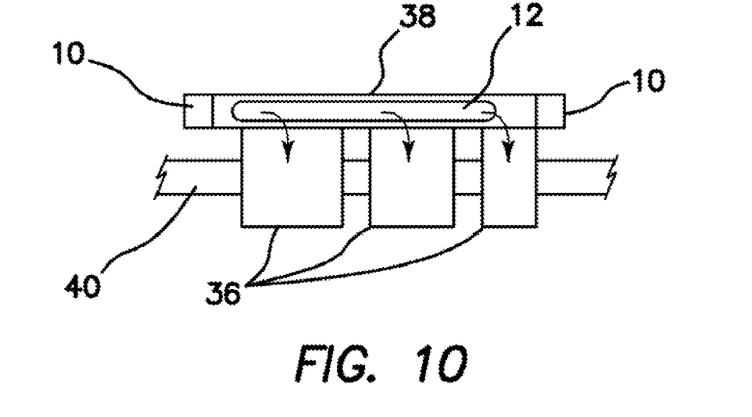
FIG. 10 is a diagram of an electrolysis microvalve.

An often unwanted side effect in micro-electromechanical systems (MEMS) is electrolysis of water and bubble formation at high-electric-field locations in the device. This effect can be utilized to actuate PDMS microfluidic valves 36. If two electrodes 10 are fabricated to coincide with a dead-end channel 40, then applying enough voltage across the electrodes 10 produces electrolysis of water into an expanding bubble of oxygen and hydrogen gas 12 as shown in FIG. 10. The small dimensions ensure that even a modest voltage produces high electric fields, since V=E*d. The gas 12 of electrolysis expands and provide the pressure to close a valve 36 pneumatically as before. Significantly, the pressure does not need to be generated at the valve 36 itself, which simplifies the device architecture and makes it compatible with current designs. For example, as single pair of electrodes 10 can actuate an array of valves 36 by use of the conventional connectivity of control channels 38 and channel crossovers.

The electrodes 10 typically can be fabricated in the chip substrate, which makes connections to pushup valves 36 straight forward. The use of vias 16 can do the same for pushdown devices. Since PDMS is permeable to gases, the generated oxygen and hydrogen escapes through the polymer matrix over time. This means the pressure drops and the valves 36 eventually open. If such opening is desirable, no further action is required. If not, voltage can be reapplied to the electrodes 10 periodically to generate more gas.

The ignition frequency can be used to tune the magnitude of the resulting pressure as may be desired. Dimensions would have to be optimized to allow rapid evacuation of the generated gas (e.g. by high surface-to-volume ratio) if fast response is required, e.g. for pumping. Alternatively, where speed is not a priority, a low surface-to-volume ratio allows maintenance of the generated pressure by less frequent ignitions. Oxygen produces charring of the PDMS, so liquids other than water can be selected instead. However, water is the simple obvious inexpensive robust solution. Each ignition requires only a small amount of gas generated to actuate the valves 36 since air is about 1,000 times less dense than water at atmospheric pressure. Thus, the losses of water due to the valve actuation are not significant next to the available volume in the channel. For applications requiring high frequency of actuation over a long time, the control channels 38 may be made bigger to serve as a water reservoir, or the macroworld interface port, which is used to insert the water in the first place, could be used as such a reservoir. To make certain that bubbles 12 do just push water out of the port, the port can be sealed off with a plug during the chip's initial setup. Electrolysis microvalves 36 could solve the problem of pressure control miniaturization, thereby enabling full system miniaturization and truly portable or handheld devices.

Electrolysis Micropumps

Just as pneumatic valves can be organized to produce pneumatic pumps as has been done in the prior art, electrolysis microvalves 36 could be organized to produce electrolysis micropumps 14 in a manner similar to that described above. The same ideas can then be applied for pumping in one direction, to-and-fro, or in a circle. Thus such micropumps 14 enable full system miniaturization for handheld devices.

The presented new electrical microdevices enhance and expand the capabilities of PDMS microfluidic technology and its scope of applications, by replacing external macroworld pneumatic control with internal microworld electric control. The latter allows whole system miniaturization and thus the advent of truly portable and handheld devices, e.g. for decentralized biomedical diagnostics.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim were set forth below in a certain combination, it must be expressly understood that the invention includes other combinations of fewer, more or different elements, which were disclosed in above even when not initially claimed in such combinations. A teaching that two elements were combined in a claimed combination was further to be understood as also allowing for a claimed combination in which the two elements were not combined with each other, but may be used alone or combined in other combinations. The excision of any disclosed element of the invention was explicitly contemplated as within the scope of the invention.

The words used in this specification to describe the invention and its various embodiments were to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims were, therefore, defined in this specification to include not only the combination of elements which were literally set forth, but all equivalent structure, material or acts for performing substantially the same function in substantially the same way to obtain substantially the same result. In this sense it was therefore contemplated that an equivalent substitution of two or more elements may be made for any one of the elements in the claims below or that a single element may be substituted for two or more elements in a claim. Although elements may be described above as acting in certain combinations and even initially claimed as such, it was to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, were expressly contemplated as being equivalently within the scope of the claims. Therefore, obvious substitutions now or later known to one with ordinary skill in the art were defined to be within the scope of the defined elements.

The claims were thus to be understood to include what was specifically illustrated and described above, what was conceptionally equivalent, what can be obviously substituted and also what essentially incorporates the essential idea of the invention.

We claim:

1. A microfluidic apparatus for measuring pressure comprising:
   a plurality of fluidic microvalves;
   a control channel for admitting a pressure to be measured communicated to the plurality of fluidic microvalves;

a plurality of flow channels corresponding to the plurality of fluidic microvalves, where each of the plurality of fluidic microvalves is characterized by a different closing/opening pressure; and a plurality of transducers corresponding to the plurality of flow channels to measure a parameter of the corresponding flow channel indicative of valve closure status from which the pressure can be determined within a magnitude interval.

2. The apparatus of claim 1 where each of the plurality of transducers comprises an electrical transducer for measuring an electrical parameter of each corresponding flow channel or an optical transducer for measuring an optical parameter of each corresponding flow channel.

3. The apparatus of claim 2 where the electrical transducer comprises a pair of electrodes communicated with the corresponding flow channel to measure electrical resistance or conductance in the flow channel through the corresponding microvalve.

4. The apparatus of claim 1 where each of the plurality of fluidic microvalves has a membrane and is characterized by a different closing/opening pressure by means of different values for a membrane parameter.

5. The apparatus of claim 4 where the membrane parameter is area of the membrane, a thickness of the membrane, or Young's modulus of the membrane.

\* \* \* \* \*